United States Patent [19]

Lloyd et al.

[11] 4,424,522
[45] Jan. 3, 1984

[54] CAPACITIVE ELECTROSTATIC STYLUS WRITING WITH COUNTER ELECTRODES

[75] Inventors: William A. Lloyd, Los Altos; Keith E. McFarland, Woodside; Kenneth E. Smith, San Jose, all of Calif.

[73] Assignee: Xerox Corporation, Stamford, Conn.

[21] Appl. No.: 206,786

[22] Filed: Nov. 14, 1980

[51] Int. Cl.³ ............................................ G01D 15/06
[52] U.S. Cl. .................................................. 346/154
[58] Field of Search ................... 346/154, 155, 135.1, 346/141

[56] References Cited

U.S. PATENT DOCUMENTS

| | | | |
|---|---|---|---|
| 3,178,718 | 4/1965 | Baron | 346/154 |
| 3,564,556 | 2/1971 | Tsukatani | 346/154 |
| 3,693,181 | 9/1972 | Marshall et al. | 346/154 X |
| 4,287,524 | 9/1981 | Ohnishi et al. | 346/154 |
| 4,315,270 | 2/1982 | Lloyd et al. | 346/155 |

*Primary Examiner*—Thomas H. Tarcza

[57] ABSTRACT

A capacitive charging mechanism is used in electrostatic stylus recorders having opposed writing nibs and counter electrodes to create electrostatic latent images on electrographic film and other dielectrically coated recording media. To capacitively charge the dielectric surface coating of such a recording medium, a writing voltage is first applied to one or more of the stylii or nibs and another writing voltage pulse is later applied to a counter electrode or electrode segment after a predetermined delay period which is selected to allow the nib voltages to stabilize. The charging of the dielectric surface coating of the recording medium to substantially a predetermined image voltage level occurs on the lead edge of the counter electrode writing voltage pulse. To prevent premature discharge of the charge deposited on the dielectric surface coating, the electrode writing voltage pulse is terminated before or simultaneously with the nib writing voltage pulse. Capacitive charging enables such recorders to print on electrographic film and other recording media having insulative substrates, accomodates increased printing rates, and reduces the sensitivity of the printing process to variations in the resistivity of the substrate when applied to recording on electrographic paper.

5 Claims, 10 Drawing Figures

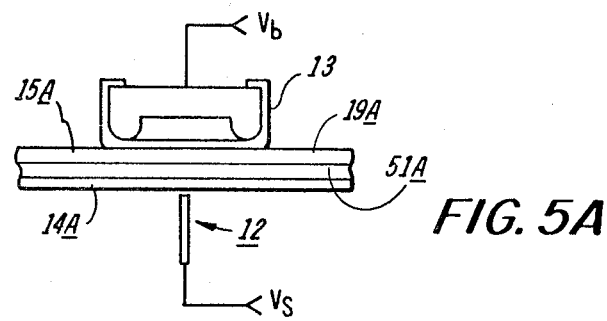
*FIG. 5A*
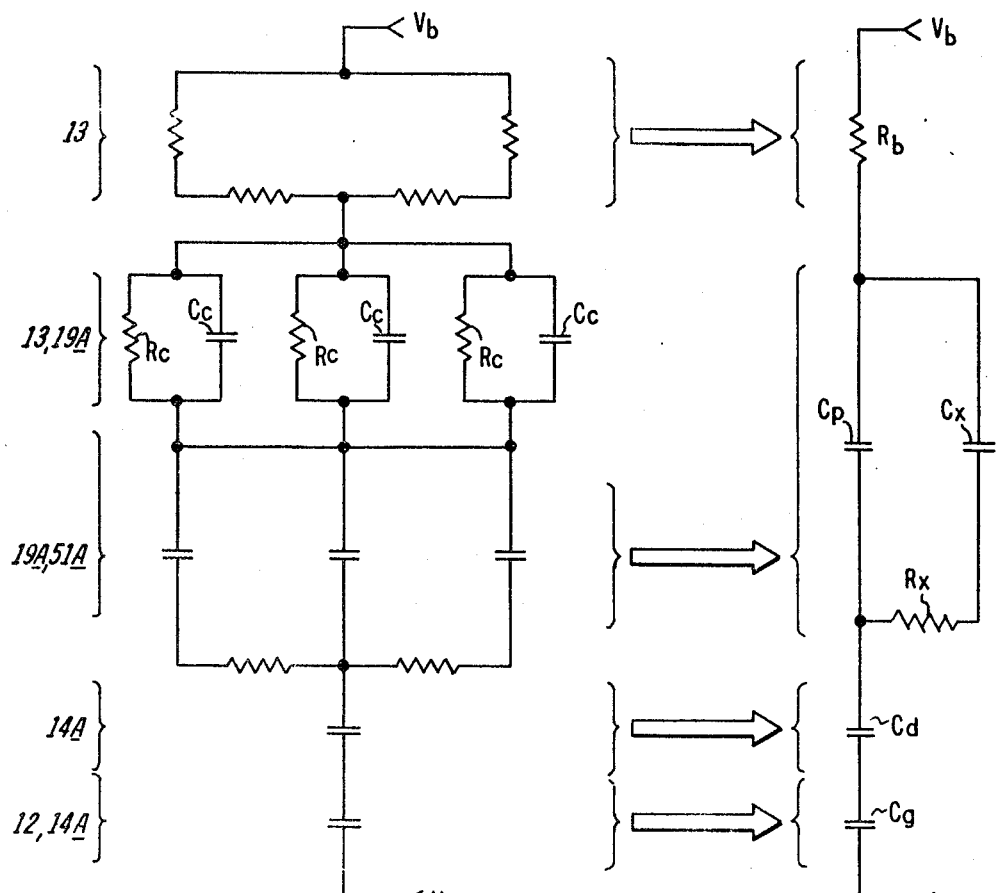
*FIG. 5B*   *FIG. 5C*

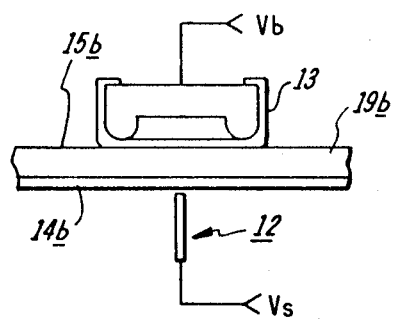
FIG. 6A
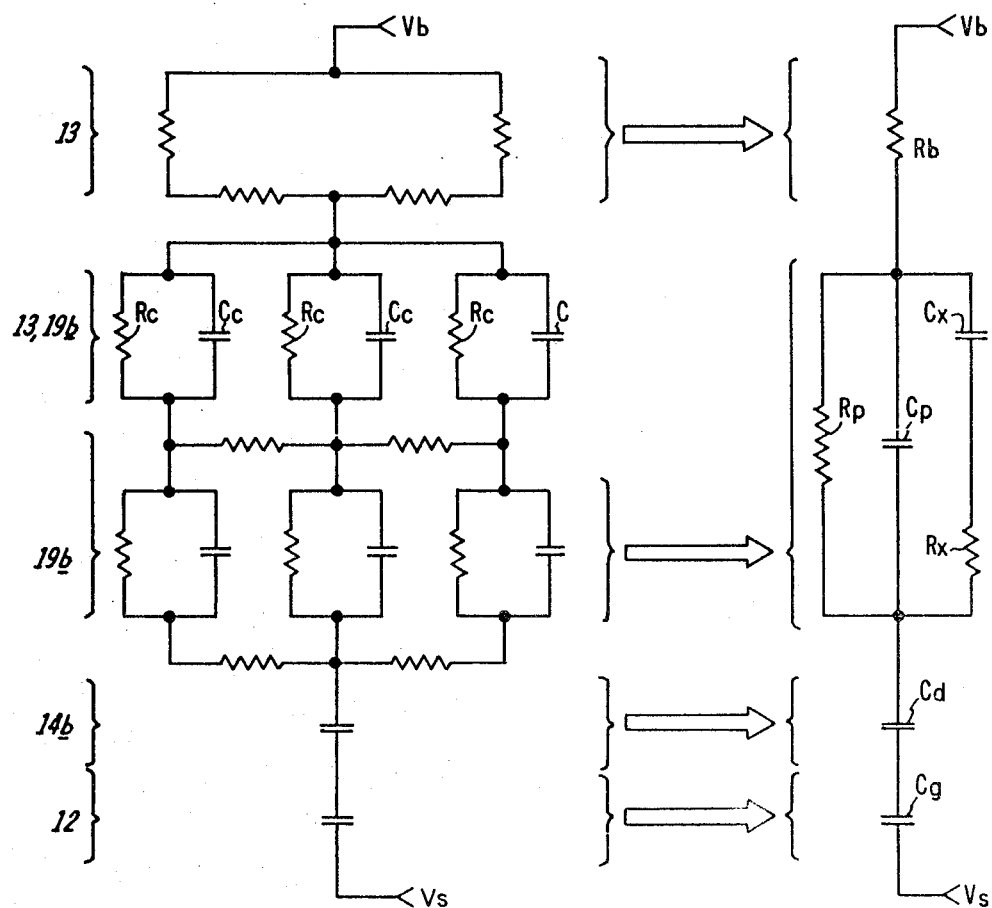
FIG. 6B
FIG. 6C

CAPACITIVE ELECTROSTATIC STYLUS WRITING WITH COUNTER ELECTRODES

FIELD OF THE INVENTION

This invention relates to electrostatic stylus recorders and, more particularly, to a capacitive charging mechanism for electrostatic stylus writing with counter electrodes.

BACKGROUND OF THE INVENTION

Heretofore, electrostatic stylus recorders using counter electrodes (as opposed to front shoe recorders) have generally relied on a resistive charging mechansim to create a latent electrostatic image on a dielectrically coated recording medium. Most counter electrode stylus recorders use a recording medium having a paper substrate with a dielectric surface coating, and the surface and/or bulk resistivity of the paper substrate is conventionally selected to facilitate resistive charging of the dielectric surface coating. Such a recording medium has enabled counter electrode stylus recorders to be employed for a variety of printing and plotting functions, but the resistive charging mechanism has limited the application of the technology.

One of the more significant limitations has been an incompatability with economically feasible transparent recording media, such as electrographic film. The insulative properties of the polyester substrate (e.g., Mylar) normally used in such a recording medium are inconsistant with a resistive charging mechanism because the stylii or writing nibs and the counter electrodes of such a recorder are disposed on opposite sides of the recording medium.

SUMMARY OF THE INVENTION

In accordance with the present invention, there is a capacitive charging mechanism which may be used in electrostatic stylus recorders to create electrostatic latent images on electrographic film and other dielectrically coated recording media. To capacitively charge the dielectric surface coating of such a recording medium, a writing voltage is first applied to one or more of the stylii or nibs and another writing voltage pulse is later applied to a counter electrode or electrode segment after a predetermined delay period which is selected to allow the nib voltages to stabilize. The charging of the dielectric surface coating of the recording medium occurs on the lead edge of the counter electrode writing voltage pulse. To prevent premature discharge of the charge deposited on the dielectric surface coating, the electrode writing voltage pulse is terminated before or simultaneously with the nib writing voltage pulse. As will be seen, capacitive charging not only overcomes the aforementioned limitation, but also accomodates increased printing rates and reduces the sensitivity of the printing process to variations in the resistivity of the substrate when applied to recording on electrographic paper.

BRIEF DESCRIPTION OF THE DRAWINGS

Still further features and advantages of this invention will become apparent when the following detailed description is read in conjunction with the attached drawings, in which

FIGS. 5A-5C are diagrams illustrating the application of capacitive writing to recording media having insulative substrates, such as electrographic films; and FIGS. 6A-6C are diagrams illustrating the application of capacitive writing to recording media having substrates with capacitive and resistive properties, such as electrographic paper.

DETAILED DESCRIPTION OF THE ILLUSTRATED EMBODIMENT

While the invention is described in some detail hereinbelow with reference to a single illustrated embodiment, it is to be understood that there is no intent to limit it to that embodiment. On the contrary, the intent is to cover all modifications, alternatives and equivalents falling within the spirit and scope of the invention as defined by the appended claims.

Figure 1:
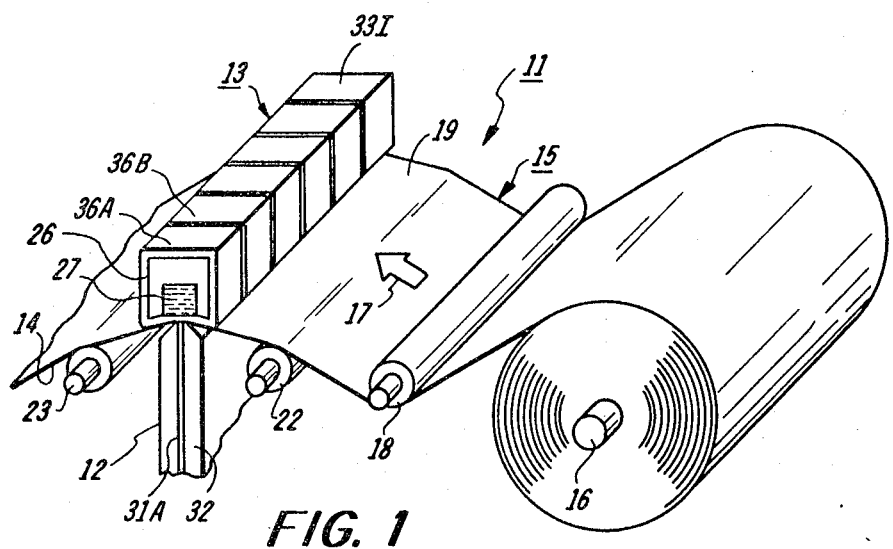
FIG. 1 is an orthographic view of a charging station for a electrostatic stylus recorder having writing nibs and counter electrodes disposed on opposite sides of a recording medium.

Turning now to the drawings, and at this point especially in FIG. 1, there is an electrostatic stylus recorder 11 (shown only in relevant part) having a writing head 12 and a conformable counter electrode 13 for depositing a latent electrostatic image on the dielectric surface coating 14 of a web-like recording medium 15. As illustrated, the recording medium 15 is stripped off a supply spool 16 and is advanced in the direction of the arrow 17 to pass between the head 12 and the electrode 13. The recording medium 15 is appropriately tensioned, such as by a tensioning roller 18, to ensure that it advanced at a controlled rate.

Figure 3:
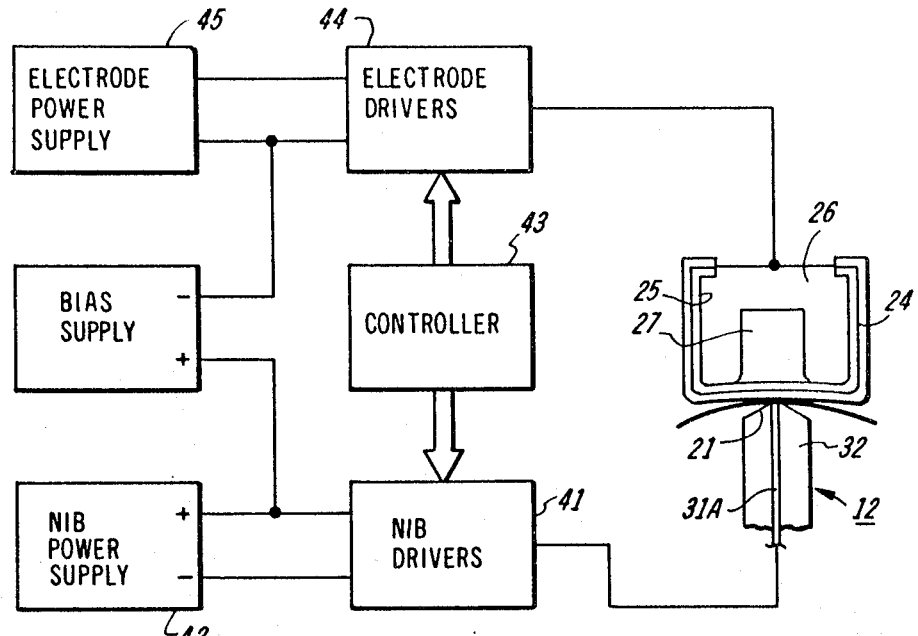
FIG. 3 is a simplified block diagram of a circuit for selectively applying writing voltage pulses to the nibs and electrodes of the recorder shown in FIGS. 1 and 2.

Advantageously, there is substantial capacitive coupling between the counter electrode 13 and the substrate 19 of the recording medium 15 so that little, if any, voltage is dropped across that interface while the dielectric surface coating 14 is being capacitively charged to a predetermined image voltage level. Thus, as best shown in FIG. 3, to enhance the capacitive coupling, the head 12 has an arcuate crown 21 which penetrates into the plane of the counter electrode 13 to increase the area of conforming contact between the counter electrode 13 and the recording medium substrate 19. Guide rollers 22 and 23 cause the recording medium 15 to wrap over the crown 21 of the head 12 with a wrap angle of, say, 11° or so, and the crown 21 is typically contoured to have a radius of approximately $\frac{1}{2}$".

The counter electrode 13 suitably comprises a 3-7 mil thick outer carbon loaded teflon membrane 24 and a 10 mil or so thick inner urethane membrane 25 which are secured to a channel shaped electrically conductive back plate 26 (see FIG. 3). The membranes 24 and 25 are laminated and are stretched over the open mouth of the back plate 26 which, in turn, is aligned to overlie the crown 21 of the head 12. The counter electrode 13 is suspended (by means not shown) to float over the head 12 and is loaded against the head 12 by a load force of approximately 4.5 kg. Cold flowing of the membranes 24 and 25 may cause some reduction in this load force as a function of time, but excessive cold flowing may be prevented by filling the back plate channel with a resilient foam 27. The modulus of elasticity of the outer membrane 24 is typically an order of magnitude or so greater than that of the inner membrane 25. Thus, the outer membrane 24 is primarily responsible for maintaining conforming contact with the recording medium substrate 19, and the inner membrane 25 is used to provide any supplemental force that may be required to substantially eliminate any isolated points of non-contact.

Figure 2:
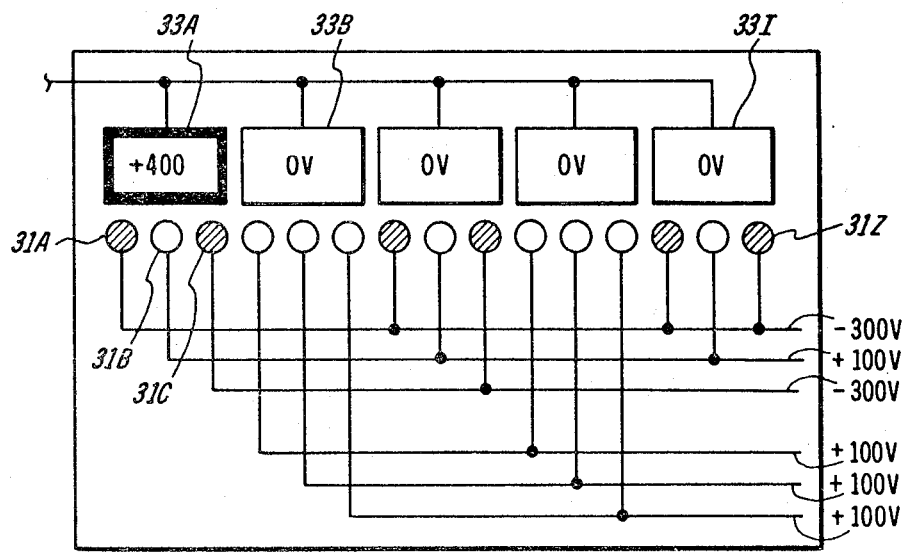
FIG. 2 schematically illustrates a matrix addressing scheme such as is conventionally used in electrostatic stylus recorders to create a latent electrostatic image on a dielectrically coated recording medium.

Referring to FIG. 2, in keeping with accepted practices, the writing head 12 comprises a plurality of nibs or stylii 31a-31z which are supported in a plastic holder 32 (FIGS. 1 and 3). As shown, the nibs 31a-31z are spaced apart widthwise of the recording medium 15 on equidistantly separated centers to form a linear array. Nevertheless, it should be understood that there may be two such arrays which are displaced from one another in the direction of the recording medium movement by twice the scan pitch. As is known, the advantage of a dual array head is that the nibs of one array may be laterally offset from the nibs of the other by one half the inter-nib spacing to obtain full density printing.

To minimize the number of nib drivers required, the counter electrode 13 is conventionally formed to have several electrically independent segments 33a-33i which are spaced apart widthwise of the recording medium 15, and the nibs 31a-31z are normally separated into parallel wired groups, with each such group containing no more than one nib opposed to any given one of the electrode segments 33a-33i. Writing occurs only when a nib and the opposed electrode segment are simultaneously at writing voltage levels. For example, as shown, nibs 31a and 31c will write because they and their opposed electrode segment 33a are at writing voltage levels. However, none of the other nibs will write because they and/or their opposed electrode segments are at non-writing or quiescent voltage levels. To write a full scan line, the electrode segments 33a-33i are sequentially brought up to a writing voltage level for successive short time periods so that the opportunity to write progressively shifts from the nibs opposed to, say, the leftmost electrode segment 33a to the nibs opposed to the rightmost electrode segment 33i.

Turning to FIG 3, there are nib drivers 41 for selectively coupling each group of nibs, as defined by the parallel wiring of the nibs 31a-31z (FIG. 2), to the high (+) or low (−) voltage side of a nib power supply 42. To accomplish that, the nib drivers 41 are selectively enabled and disabled in response to a set of parallel control signals from a controller 43. Similarly, there are electrode drivers 44 which are selectively enabled and disabled in response to another set of parallel control signals from the controller 43 to selectively couple the electrode segments 33a-33i (FIG. 2) to the high (+) or low (−) voltage side of an electrode voltage supply 45. Capacitive writing on an electrographic medium requires a nib-to-electrode voltage drop of approximately 700 volts. Thus, the electrode power supply 45 is a 400 volt supply which is operated with its low (−) voltage side referenced to ground (0 V.). The nib power supply 42 is also a 400 volt supply, but its high (+) voltage side is biased above ground by a 100 volt bias supply 46. Consequently, the nibs 31a-31z swing between a −300 volt writing voltage level and a +100 volt quiescent voltage level, and the electrode segments 33a-33i swing between a +400 volt writing voltage level and a 0 volt quiescent voltage level. Of course, the optimum voltages for capacitive writing are dependent on the recording medium 15 and, therefore, the values set forth are merely examples.

Figure 4:
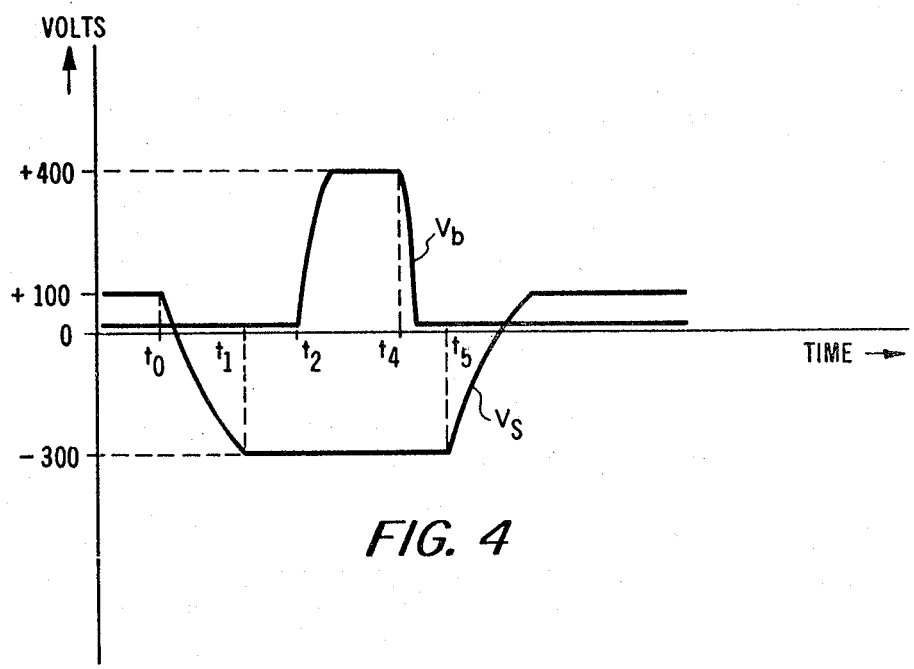
FIG. 4 is a timing diagram of the sequencing of the nib and electrode writing voltage pulses that cause capacitive writing in accordance with the present invention.

In accordance with the present invention, as shown in FIG. 4, capacitive writing is performed by first enabling one or more of the nib drivers 41 (FIG. 3 ) to apply a writing voltage pulse $V_s$ to selected ones of the nibs 31a-31z at a time $t_1$ and by subsequently enabling one of the electrode drivers 44 (FIG. 3) to apply a writing voltage pulse $V_b$ to one of the counter electrode segments 33a-33i at a later time $t_3$. Writing occurs on the lead edge of the counter electrode pulse $V_b$, during a relatively short rise time period. Accordingly, the controller 43 (FIG. 3) delays the counter electrode pulse $V_b$ for a period $t_1$-$t_3$ which is longer than the period $t_1$-$t_2$ that is required for any significant transients in the nib writing pulse to settle out. To prevent premature discharge of the charge deposited on the dielectric surface coating 14 of the recording medium 15 (FIG. 3), the selected electrode driver 44 is disabled to terminate the electrode writing pulse at a time $t_4$, before the selected nib drivers 41 are disabled to terminate the nib writing pulse at a later time $t_5$. Alternatively, the selected nib drivers 41 and the selected electrode driver 44 may be disabled at the same time to substantially simultaneously terminate the nib and writing voltage pulses. Typically, the time period $t_1m14\ t_3$ is approximately 20 microseconds, the time period $t_3$-$t_4$ is approximately 20 microseconds, and the time period $t_4$-$t_5$ is 8 microseconds.

Turning to FIGS. 5A-5C, capacitive writing may be advantageously utilized to deposit an electrostatic image on an electrographic recording medium having a fully insulative substrate, such as a transparent electrographic film 15a. As shown in FIG. 5A the film 15a comprises a dielectric surface coating 14a, an intermediate conductive layer 51a, and a polyester substrate 19a. Preferably, the conductive layer 51a is grounded (by means not shown) to ensure that it remains at a fixed potential. FIG. 5B is an equivalent circuit model for the nib, electrographic film, and counter electrode combination of FIG. 5A. Due to the large area of conforming contact between counter electrode 13 and the substrate 19a, it may be assumed that the contact impedance represented by the resistances $R_C$ and the capacitances $C_c$ is negligible. Furthermore, it may be assumed that the resistance $R_b$ of the electrode 13 is much smaller than the resistance $R_x$ of the intermediate conducting layer 51a. Thus, the equivalent circuit may be simplified as shown in FIG. 5C, where $C_p$ and $C_x$ represent the capacitance of the polyester substrate 19a, $C_d$ the capacitance of the dielectric surface coating 14a, and $C_g$ the capacitance of the ionized gap between the write head 12 and the dielectric surface coating 14a.

As shown in FIGS. 6A-6C, capacitive writing may also be used to deposit a latent electrostatic image on an electrographic recording medium 15b having a paper substrate 19b, such as a conventional electrographic paper. It may again be assumed that the contact impedance $R_c$, $C_c$ between the electrode 13 and the recording medium substrate 19b is negligible. However, the equivalent circuit (FIG. 6B) and the simplified equivalent circuit (FIG. 6C) now include the distributed series and parallel resistance and capacitance $R_x$, $C_x$ and $R_p$, $C_p$ of the paper substrate 19b. Capacitive charging of the dielectric surface coating 14b can be achieved as a result of current flow through the capacitance $C_p$, even though the substrate resistance $R_p$ that is conventionally utilized for resistive charging is present. As a general rule, the surface resistivity $R_x$ of paper is much lower than its bulk resistively. Thus, during the capacitive charging period, the bulk resistance $R_p$ of the paper substrate 19b may be ignored. In other words, the paper substrate 19b is insulative for capacitive writing and conductive for resistive writing. Capacitive writing is inherently faster than resistive writing because charge is capacitively deposited on the dielectric surface coating 14b on the lead edge of the counter electrode write pulse. Also, capacitive writing is inherently less sensitive to variations in the bulk resitivity of the substrate than resistive writing because the bulk resitivity $R_p$ of the substrate 19b does not directly enter into the capacitive writing process.

CONCLUSION

In view of the foregoing, it will now be understood that the present invention provides a capacitive writing mechanism which may be used in electrostatic stylus recorders to print latent electrostatic images on electrographic recording media having insulative substrates. Furthermore, it will be appreciated that the insulative characteristic of the substrate may be a transitory property, such as in an electrographic paper.

What is claimed is:

1. In an electrostatic stylus printer having at least one nib and at least one counter electrode aligned on opposite sides of a dielectric coated recording medium with said nib being adjacent to said dielectric coating, and means for maintaining said counter electrode in conforming contact with said recording medium such that there is relatively little contact impedance between said counter electrode and said recording medium; the improvement comprising means for applying a first writing voltage pulse to said nib and a second writing voltage pulse to said counter electrode in timed sequence and for predetermined time periods;

said sequence being selected to enable said nib to substantially stabilize at a predetermined writing voltage level prior to the application of said second writing voltage pulse, whereby said dielectric coating is capacitively charged to approximately a predetermined image voltage level in response to the application of said second writing voltage pulse, and said time periods being selected so that said second writing voltage pulse terminates no later than said first writing voltage pulse, thereby preventing premature discharge of said dielectric coating.

2. The improvement of claim 1 wherein
   said recording medium is an electrographic film having an insulative substrate, an intermediate conductive layer, and a dielectric surface coating;
   said counter electrode is maintained in conforming contact with said substrate; and
   said nib is adjacent said dielectric surface coating.

3. The improvement of claim 2 wherein
   said nib is supported in a write head having an arcuate crown;
   said recording medium is wrapped over said crown;
   said counter electrode comprises a flexible, electrically conductive membrane and a generally channel shaped back plate having an open mouth;
   said membrane is stretched over said mouth and is secured to said back plate;
   said counter electrode is loaded against said head such that said head penetrates into said mouth to deform said membrane, thereby increasing the area of conforming contact between said counter electrode and the substrate of said recording medium.

4. The improvement of claim 1 wherein
   said recording medium is an electrographic paper having a paper substrate and a dielectric surface coating;
   said counter electrode is maintained in conforming contact with said substrate; and
   said nib is adjacent said dielectric surface coating.

5. The improvement of claim 4 wherein
   said nib is supported in a write head having an arcuate crown;
   said recording medium is wrapped over said crown;
   said counter electrode comprises a flexible, electrically conductive membrane and a generally channel shaped back plate having an open mouth;
   said membrance is stretched over said mouth and is secured to said back plate;
   said counter electrode is loaded against said head such that said head penetrates into said mouth to deform said membrane, thereby increasing the area of conforming contact between said counter electrode and the substrate of said recording medium.

* * * * *